United States Patent [19]

Haas et al.

[11] Patent Number: 4,491,044

[45] Date of Patent: Jan. 1, 1985

[54] DAMPED TOOL TURRET

[75] Inventors: Robert G. Haas, Georgetown; John R. Hasz, Fayetteville; David B. Wood, III, West Chester, all of Ohio

[73] Assignee: Cincinnati Milacron Inc., Cincinnati, Ohio

[21] Appl. No.: 472,000

[22] Filed: Mar. 4, 1983

[51] Int. Cl.³ .................... B23B 29/28; B23B 29/30
[52] U.S. Cl. ...................... 82/36 A; 74/826; 408/35; 408/143; 82/DIG. 9
[58] Field of Search ............ 82/36 A, DIG. 9; 408/35, 143; 74/826

[56] References Cited

U.S. PATENT DOCUMENTS

| 3,438,289 | 4/1969 | Kampmeier | 409/904 |
| 3,595,109 | 7/1971 | Burroughs et al. | 82/36 A |
| 3,747,470 | 7/1973 | Inoue et al. | 408/143 |
| 3,797,333 | 3/1974 | Maier | 74/826 |
| 3,837,758 | 9/1974 | Streicher | 408/143 |
| 3,894,453 | 7/1975 | Kusters | 407/64 |

FOREIGN PATENT DOCUMENTS 1238311   4/1967   Fed. Rep. of Germany ...... 408/143

Primary Examiner—Leonidas Vlachos
Attorney, Agent, or Firm—Thomas M. Farrell

[57] ABSTRACT

A facial relief and seal creates a closed damping chamber between the spindle end face and adjacent tool support plate. A plurality of tools are located on the face plate near the outer periphery. In one embodiment, a viscous medium, such as oil, is provided in the damping chamber. In an alternate embodiment, a visco-elastic material, such as PVC, is provided in the damping chamber. Relative movement between the spindle end face and the tool support plate will cause vibration damping.

4 Claims, 3 Drawing Figures

DAMPED TOOL TURRET

BACKGROUND OF THE INVENTION

In the field of turning and boring machines, it is frequently necessary to use a multiple tool turret for carrying an array of boring bars for particular machining operations. Many prior art assemblies utilize a rotatable indexable spindle in a turret housing, wherein a large facial area of the spindle is provided to provide a large swing radius for clearing previously used tools out of the way for a new tool entry as a turret is indexed. The turret assemblies frequently carry boring bars which extend from the face of the tool turret spindle in a cantilever fashion, and are subject to high deflection in and of themselves, but, when coupled with the diaphragming or overturning of the radial plate which supports them, the deflection may be compounded.

When vibrations are encountered, the boring bars can vibrate an objectionable amount. It has been the previous practice, to provide a relatively stiff turret bearing mounting assembly, to attempt to prevent the turret spindle face from deflecting an objectionable amount, and other prior art efforts have been directed at providing stiff boring bars, which are not discussed in this disclosure. Applicant has determined that very little damping exists in the prior art assemblies to counteract any vibrational movements which may occur on a cantilevered boring bar.

Applicant has obviated the difficulties inherent in the prior art devices, by a novel damped tool turret, having a relatively low static stiffness, but a relatively high dynamic stiffness, due to the inherent damping properties of the assembly.

SUMMARY OF THE INVENTION

The invention is shown embodied in a damped tool turret, wherein a turning machine is provided with a turret housing adapted to a machine base, and a rotatable turret spindle, having a large area end face, is carried in the housing. A large tool support plate is mounted to the end face of the turret spindle, and a large-area facial relief is provided on one of the members, to create a small gap between the two. Seal means is provided around the gap, to create a damping chamber between the end face of the spindle and the tool support plate. A plurality of turning tools, for example, boring bars, are carried near the outer periphery of the tool support plate, in a cantilever fashion. In the preferred embodiment, a viscous damping medium such as hydraulic fluid is carried in the damping chamber, and means to index the spindle to predetermined angular positions for machining operations is provided. The relatively low static stiffness of the assembly permits the utilization of the damping medium in the assembly, so that in actual operation, the relative movement of the end face and tool support plate will damp vibrational movements by the phenomenon of squeeze film damping, due to the relative movement between the two, thereby increasing the dynamic stiffness of the assembly.

In an alternate embodiment, a visco-elastic material is placed in the damping chamber to dampen the vibration.

DESCRIPTION OF THE PREFERRED EMBODIMENT

Figure 1:
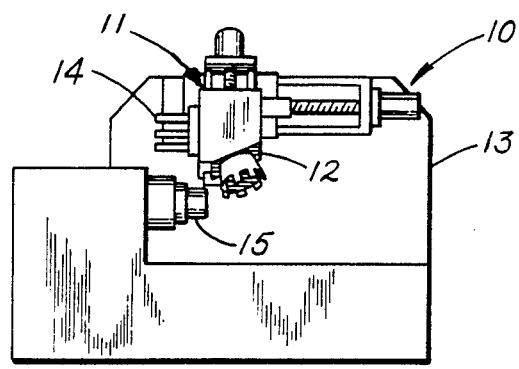
FIG. 1 is an environmental view, showing a turning machine utilizing a turret assembly of the present invention.

Referring to the drawings, FIG. 1 depicts a turning machine 10 utilizing a damped tool turret 11 of the present invention, wherein the tool turret 11 has a housing 12 adapted to move on a machine tool base 13, and the tool turret 11 carries an array of turning tools 14 such as the boring bars shown. The tool turret 11 is indexed by an indexing means (not shown) to present alternate tools 14 to the workpiece 15 for machining operations.

Figure 2:
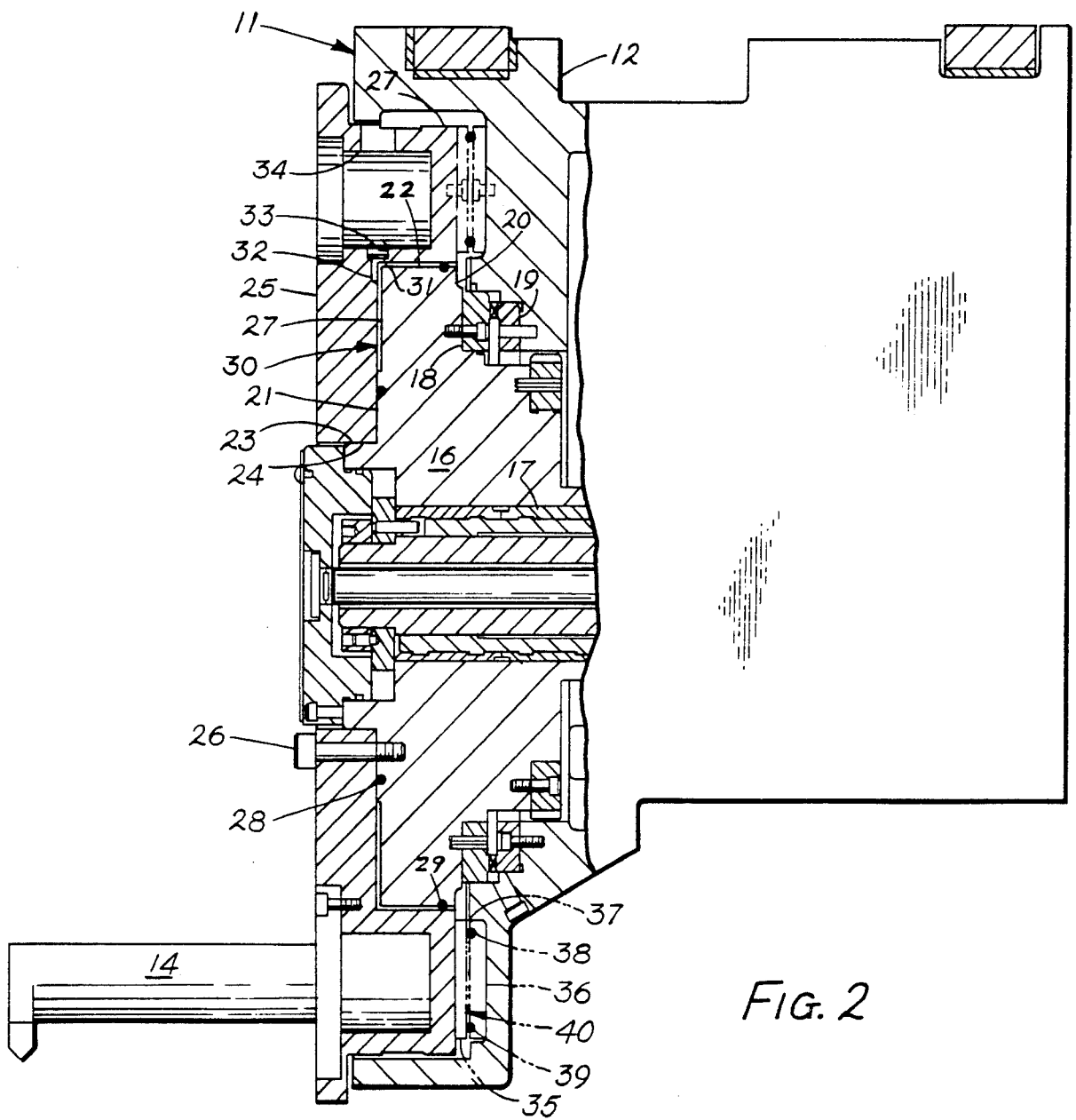
FIG. 2 is a plan section taken through the damped tool turret of FIG. 1.

FIG. 2 illustrates a sectional view through the tool turret 11 of FIG. 1, wherein the tool turret housing 12 supports a rotatable spindle 16 in spindle bearings 17, and the spindle 16 may be moved axially, for subsequent index on the toothed index plates 18,19 shown in a conventional manner. The spindle 16 is provided with a large-diameter flange 20, having an end face 21. The end face 21 extends from the outer diameter 22 to a central pilot diameter 23. The pilot diameter 23 receives the bore 24 of a tool support plate 25, and the tool support plate 25 is held to the end face 21 by a plurality of cap screws 26. A large-area relief 27 is machined into the end face 21 to create a facial gap between the two 21,25 extending from a diameter just beyond the cap screws 26, out to the diameter 22. The tool support plate 25 has a peripheral rim 27 which extends back over the outer diameter 22 of the flange 20, and a gap is maintained between the two 20,22, to provide for relative flexing and movement of the tool support plate 25 in operation. A first seal 28 is provided between the end face 21 and tool support plate 25, around the screws 26 and a second seal 29 is provided at the rim 27, so that a damping chamber 30 is formed between the tool support plate 25 and the turret spindle 16. The damping chamber 30 is filled with a viscous medium 31 such as hydraulic oil, through a filling hole 32 which is later-plugged with a pipe plug 33. Axial pockets 34 are machined in the rim 27 of the tool support plate 25, which receive cantilevered tools 14, such as boring bars. In a static mode, the assembly has a relatively weak static stiffness when radial force is applied against the boring bar 14, due to the cantilevered deflection of the boring bar 14, taken in conjunction with the diaphragmable deflection of the tool support plate 25 due to the overturning moment acting on the boring bar 14. However, in a machining mode, the relative movement permitted between the tool support plate 25 and end face 21 of the turret spindle 16 permits the phenomenon known as squeeze film damping to occur, wherein the oil trapped between the two 21,25 will be alternately squeezed and pulled under tension due to the inherent stickiness of the oil, thus tending to attenuate vibrational movements and damp the assembly. The net result is that extremely high dynamic stiffnesses are possible while machining. While some relative movement of the rim 27 over the outer diameter 22 of the flange 20 will cause minor shearing of the oil to occur, the principal damping factors come from the interaction of the large-area flat plate surfaces acting on the squeeze film.

In an alternate embodiment, a pair of opposing plates 35,36 are mounted to the rear of the face plate rim 27 and the housing 12, respectively. The plates 35,36 are dimensional to maintain a gap 37 therebetween, and seals 38,39 are provided to create a closed damping chamber 40 between the relatively moveable plates 35,36.

Figure 3:
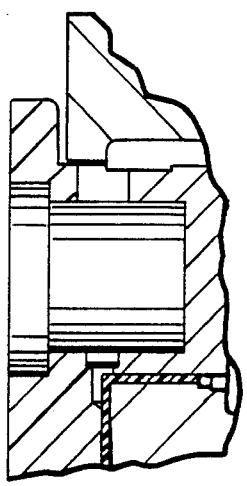
FIG. 3 is a section through a tool pocket depicting an alternate embodiment.

Another alternate embodiment is shown in FIG. 3. A visco-elastic damping material 41, such as PVC (polyvinyl chloride), is substituted in the damping chamber 30 for the viscous medium 31. This type of material has the characteristic of being able to dissipate energy when displaced. The visco-elastic materials used in damping units behave quite definitely in an elastic manner up to some stress limit, but once that stress is exceeded, it flows until its area increases and stresses go down until it becomes elastic again.

Strictly considered, in a damper designed for squeeze film, the direct substitution of a visco-elastic material would result in somewhat less damping of the structure, but this may be suitable for some applications. The visco-elastic materials can have a damping capability 20 times that of rubber, but the squeeze film damper can possess a damping capability three or four times that of the visco-elastic damper.

The invention is not limited to the specific embodiment shown herein, but rather the invention extends to all such designs and modifications as come within the scope of the appended claims.

What is claimed is:

1. A damped tool turret for a machine tool, comprising:
   (a) a turret housing;
   (b) means for mounting said housing to a machine tool base;
   (c) a spindle, rotatably journalled in said housing, said spindle having an elongate body rotatable about a central axis;
   (d) an end face defined on said spindle, said end face having an outer periphery substantially larger than the periphery of said elongate spindle body;
   (e) a tool support plate mounted in juxtaposition with said end face, said tool support plate having an outer periphery substantially larger than the elongate spindle body;
   (f) means for rotating said end face and said tool support plate in unison with said spindle;
   (g) a facial relief defined on one of said end face and said tool support plate near the outer periphery thereof, said relief disposed toward the other of said face and support;
   (h) means for sealing said relief so as to create a damping chamber between said end face and said tool support plate;
   (i) means for holding a tool near the outer periphery of said tool support plate;
   (j) a damping medium in said damping chamber; and
   (k) means for indexing said spindle to predetermined angular positions about said central axis.

2. The damped tool turret of claim 1, wherein said tool is mounted in a cantilever fashion along a tool axis extending normal to said tool support plate.

3. The damped tool turret of claim 1 or 2, wherein said damping medium comprises a viscous medium.

4. The damped tool turret of claim 1 or 2, wherein said damping medium comprises a visco-elastic medium.

* * * * *